United States Patent [19]

Tanuma et al.

[11] Patent Number: 4,849,869

[45] Date of Patent: Jul. 18, 1989

[54] SWITCHING REGULATOR HAVING A PULSE WIDTH CONTROL SYSTEM

[75] Inventors: Jiro Tanuma; Shinichi Katakura, both of Tokyo, Japan

[73] Assignee: Oki Electric Industry Co., Ltd., Tokyo, Japan

[21] Appl. No.: 180,073

[22] Filed: Apr. 11, 1988

[30] Foreign Application Priority Data

Apr. 15, 1987 [JP] Japan ................................. 62-90630

[51] Int. Cl.⁴ .......................................... H02M 3/335
[52] U.S. Cl. ......................................... 363/21; 363/56
[58] Field of Search ........................... 363/21; 323/283

[56] References Cited

U.S. PATENT DOCUMENTS 4,761,702  8/1988  Pinard .................................. 363/21

FOREIGN PATENT DOCUMENTS 83533  7/1983  European Pat. Off. .............. 363/21
4819   1/1981  Japan .................................... 363/21

OTHER PUBLICATIONS

Rizzo, "Flyback Converter System", IBM Tech. Discl. Bul., vol. 23, No. 8, pp. 3652–4, Jan. 1981, (363/21).

Primary Examiner—William H. Beha, Jr.
Attorney, Agent, or Firm—Wenderoth, Lind & Ponack

[57] ABSTRACT

A switching regulator includes a high frequency transformer having a primary and secondary and tertiary windings. It also has a switching element and shunt regulator and photo coupler and control circuit and these elements are arranged for controlling the on-period and the on-time of the switching element so as to increase the on-period as well as the on-time when the load is heavy. The switching losses caused by the limit of the capability of the switching element as a result of an increase in the on-period upon the load becoming light are prevented while the switching frequency is prevented from becoming an audio frequency upon the load becoming heavy. Thus, a high efficiency switching regulator with a wide range of equal load capacities may be constructed.

2 Claims, 9 Drawing Sheets

- LOWERING OF EFFICIENCY
- INTERMITTENT OSCILLATION

- LOWERING OF EFFICIENCY
- INTERMITTENT OSCILLATION

SWITCHING REGULATOR HAVING A PULSE WIDTH CONTROL SYSTEM

BACKGROUND OF THE INVENTION

1. Field of the Invention

The present invention relates to a stabilized power circuit, and, more particularly to a switching regulator in a pulse width control system.

2. Description of the Prior Art

Prior switching regulators of this type, which operate in a line operation system, adopt the following control methods: one method, the so-called variable frequency method wherein a duty cycle is changed while the pulse width is kept unchanged; and another method, the so-called pulse width control method wherein a pulse width is changed while the frequency is kept unchanged. Circuits to execute these methods are illustrated in FIGS. 6 and 9, respectively.

Both circuits are basically arranged as follows. A fraction of a DC output from the circuit using either the variable frequency method or the pulse width control method is fedback to a control circuit 1. In this control circuit 1, the fraction of the DC output is compared in an error amplifier 7 with a reference voltage and outputted to a V/F converter 9 (in the case of the variable frequency method as illustrated in FIG. 6) or a pulse width converter 8 (in case of the pulse width control method as illustrated in FIG. 9). The V/F converter 9 or the pulse width converter 8 modulates an output signal from an oscillator (not shown) with respect to its frequency (in case of the former method) or with respect to its pulse width (in case of the latter) in response to the output from the error amplifier 7 or 8. (The oscillator circuit, in the above description, may sometimes be omitted in a self-exciting system). The output signal from this control circuit 1 is then fed to a driver circuit 2 composed of a driver and a current transformer to permit the driver circuit 2 to drive for error correction a switching part 3 composed of high voltage, high speed switching transistors, called a main switcher in their combination, and of a pulse transformer. As a result, a main signal is fed from an input circuit 6, which serves to supply energy to this apparatus, to the pulse transformer of the switching part 3 and is error corrected. Thereafter, the error corrected main signal is boosted to a higher pulsed voltage by the pulse transformer, the high frequency transformer, and is outputted from a DC output terminal after passing through a rectifier part 4, which serves to rectify the pulsed voltage, and through a filter part 5 for smoothing the rectified/voltage.

The variable frequency method illustrated in FIG. 6 provides the V/F converter 9 in the control circuit 1, i.e., an A/D converter part, which permits the main switcher (composed of power transistors) to have its on-time kept unchanged but to have its switching frequency changing in comformity with the magnitude of the load used, for the purpose of keeping the output from the switching regulator constant. This is shown in FIG. 8 wherein the number of on-pulses for each unit of time, i.e., the repetition frequency of those pulses is increased as the load on the output becomes heavy, while the number of pulses is reduced as the load becomes light, to thereby keep the output constant. As a result, the operating frequency may fall into an audio range of frequency at no load.

In contrast with this variable frequency method, the pulse width control method illustrated in FIG. 9 provides the pulse width converter circuit in the control circuit 1, i.e., in the A/D converter part, which keeps the operating frequency constant at all times, and changes the on-time in the period T, thereby making the output constant. This is shown in FIG. 11 wherein the width of the on-pulse is increased as the load on the output becomes heavy, while the pulse width is made narrow at a light load, to thereby keep the output voltage constant.

In the following discussion, the operation of the switching regulator in the line operation system described above will be described with reference to FIGS. 7 and 10.

AC voltage is input into the input circuit 6, rectified through a rectifier, and smoothed through a filter (capacitor input type). The smoothed high DC voltage serves to bias the switching part 3.

The bias voltage from the input circuit 6 is converted to a high AC voltage with a frequency of from 20 KHz to 40 KHz by the switching transistors of the switching part 3 and transmitted to the rectifier part 4 on the secondary side through the pulse transformer.

The rectifier part 4 rectifies the high frequency AC voltage through fast recovery time rectifying diodes and supplies it to a load as DC voltage with a reduced ripple fraction through the filter part 5.

The following is a description as to how to stabilize the output from the switching regulator. The error amplifier 1 connected to the output terminal senses constantly the output voltage at the output terminal. The error amplifier 7 compares the output voltage with the reference to detect a fraction of error and amplifies the error signal. The error signal thus amplified is transmitted to the next pulse width converter 8 (in the pulse width control system) or to the V/F converter 9 (in the frequency control system), both belonging to the control circuit 1, to provide a control signal. These converters include a fixed frequency oscillator in the pulse width control system and a variable frequency oscillator in the frequency control system.

The control signals output from these converters are divided respectively into two phases through a two-phase divider circuit when the switching part 3 is of a push-pull type, while it is transmitted to the driver circuit 2 when the switching part 3 is single-ended.

The driver circuit 2 drives the switching transistors of the switching part 3, and mostly serves to insulate the primary side (input side) from the secondary side (output side). The switching transistors of the switching part 3 driven by the driver circuit 2 control the DC output using the control signal for the stabilization thereof.

The flow of the control signal forms a closed loop as described above, and the input power from the input circuit flows to the output side.

The following is a discussion of another example of the switching regulator in the pulse width control system and will be described with reference to a circuit block diagram of FIG. 12. The system controls the DC output from the switching regulator by detecting an error voltage from a third winding wound around the same transformer core as that of the secondary winding.

A switching element 10, a MOS FET in this embodiment, is switched on by allowing a voltage divided by a resistor 11 for starting the power circuit together with a resistor 12 to be applied to the drain and source thereof, to thereby start the conduction of a current through the primary winding 13 of a transformer 32. A resistor 14 detects the current. Resistors 15, 16 and transistor 17 constitute an overcurrent protector. The overcurrent protector serves to switch the switching element 10 off by switching the transistor 17 on using the voltage across the resistor 14 upon the appearance of the overcurrent. Thus, the switching element 10 has its gate potential lowered and is switched off.

Resistors 18, 19, a diode 20, and capacitors 21, 22 constitute a driver circuit for the switching element 10. The driver circuit serves to rapidly switch the switching element 10 on, upon the current starting to flow through the third winching 23 by supplying the voltage produced across the third winding 23 to the gate of the switching element 10 through a differentiation circuit composed of a capacitor 22 and a resistor 12. The driver circuit thereafter continues to supply the voltage and current produced across and through the third winding 23 to the gate of the switching element 10 via the resistors 19, 18, the diode 20, and the capacitor 21.

The switching element 10 is switched off by allowing the gate potential thereof to be lowered owing to the drop of the voltage across the tertiary third winding 23 the drop being produced by the reduction of a change in the current flowing through the primary winding 13 caused by a change in output impedance of the switching element 10 defined by the overcurrent protector circuit or the gate potential of the switching element 10.

A control part for effecting the stabilization of the output voltage includes resistors 24, 25, capacitors 26, 27, and a shunt regulator 28. The control part serves to make the tertiary winding voltage (the voltage across a capacitor 30) produced by a diode 29 and the capacitor 30 constant. The reason why the tertiary voltage is made constant is that the tertiary winding 23 is wound around the same transformer core as that of the secondary wiring 31 to couple with the latter magnetically to result in the output voltage being kept constant.

The control part in operation forces the shunt regulator 28 to change its cathode current such that voltage divided by the resistors 24 and 25 becomes constant. It accordingly lowers the tertiary voltage when it is high, by dropping the gate potential of the switching element by increasing the current absorption by the gate of the switching element 10 to thereby drop the gate potential of the same and hence by lowering the current flowing through the switching element 10. In opposition, it raises the tertiary voltage when it is low, by reducing the current absorption by the gate of the switching element 10 to thereby raise the gate potential of the same and hence by increasing the current flowing through the same.

The capacitor 27 here serves as an integrating factor. That is, it forces the control circuit to operate with the average of the tertiary voltage. The resistor 25 thereupon acts as a differentiation factor for compensating for the phase characteristic of the control circuit delayed by the capacitor 27.

Now, energy stored in the transformer 32 during the time the switching element 10 is on forwardly biasses a diode 33 on the side of the secondary winding 31 to charge the capacitor 30 and likewise forwardly biases a diode 29 on the side of the tertiary winding 23 to charge the capacitor 30, by allowing the switching element 10 to be switched off. Simultaneously, the energy backwardly biases the gate potential of the switching element 10 to keep the switching element 10 off through the resistor 19, and the capacitors 21, 22.

When the transformer 32 releases completely the energy stored therein during the off period of the switching element 10, the back bias to the gate electrode of the switching element 10 is removed to permit the switching element 10 to enter the on period thereof. Thus, the voltage across the tertiary winding 23 produced owing to the current flowing through the primary winding 13 raises the gate potential of the switching element 10 via the capacitor 22 to rapidly switch the switching element 10 on. This operation is repeated thereafter.

The circuit described above is operated in the variable frequency mode which allows the switching element to have in its on-period changed depending upon the load capacity as well having its on-time changed of the same rate as that of the on-period. FIGS. 13 and 14 illustrate relationships between the on-periods and the on-times respectively in the pulse width control and variable frequency methods, and between load frequencies and gains of the switching regulator in the same methods.

Those prior methods described above however suffer from the following difficulties when the load varies widely:

(1) The pulse width control method is fixed in the frequency within the range of a high frequency, the output becomes impulsive with a light load, which the control element can not follow to result in increased loss and severely reduced efficiency.

(2) With the load made further light, the switching element might sometimes not be switched on to cause intermittent oscillation with its period being lower than an audio frequency (lower than 20 KHz) followed by an oscillation sound.

(3) The frequency fixed on the side of a lower frequency in the pulse width control method prolongs the on-time with a heavy load, and hence requires large-sized transformers and filters, etc., to make it difficult to provide a compact power supply device.

(4) In the variable frequency method, reduction of the on-period with a light load shortens the on-time to cause the foregoing difficulties (1) and (2).

(5) Further, in the variable frequency method, a heavy load causes a frequency lowering to an audio frequency with an oscillation sound produced thereby.

(6) The control method shown in FIG. 12 effects the control on an average since the error voltage taken from the tertiary winding voltage is fedback using an integrated waveform. It accordingly allows disadvantageously the stability of the output voltage to be deteriorated for transient variations in the load.

(7) The control circuit composed of analog elements makes it difficult to yield them in the form of an LSI device, and thus is prevented from being small-sized.

SUMMARY OF THE INVENTION

In view of the drawbacks of the conventional switching regulators, it is an object of the present invention to provide a high efficiency switching regulator with a wide range of equal load capacity capable of preventing the loss of switching from being increased, the loss being produced owing to the limit of the switching capability of a switching element when the on-period is raised with a light load, while preventing the switching frequency from falling into an audio-frequency with a heavy load.

Another object of the present invention is to provide a switching regulator including a control circuit having a digitized construction for thereby preventing the output voltage from being varied owing to the variations of the constituent elements, and being capable of minimizing its size by being constructed in the form of an LSI device.

To achieve the above objects, a switching regulator of the present invention comprises: (a) a high frequency transformer 42 composed of a primary winding 43 wound around a core on the primary side across which an AC input fed through a diode bridge 35 and a low pass filter is applied, a secondary winding 44 wound around the transformer core on the secondary side for boosting the rectified AC input and for transmitting the same to an output terminal through a rectifier circuit, and a tertiary winding wound around the transformer core on the primary side for providing a voltage signal thereacross as an error signal;

(b) a switching element 49 connected to one end of both said primary and tertiary windings for switching said rectified AC input to permit the switched AC input to be boosted and for transmitted to the secondary side through said secondary winding for providing the DC output voltage;

(c) a shunt regulator provided on the secondary side of said high frequency transformer for detecting a fedback fraction of the DC output voltage as another error signal;

(d) a photocoupler connected to said shunt regulator for feedbacking said fedback fraction of the DC output voltage detected by said shunt regulator to the primary side;

(e) a control circuit part provided on the primary side of said high frequency transformer and composed of analog to digital converters for converting to digital signals said voltage signal appearing across the tertiary winding, said fedback fraction of the DC output voltage, and a current signal flowing through said switching element and through said primary and tertiary windings as input signals to the later stages such as latches for the former two voltages latching said A/D converted digital signals of said voltage signal across the tertiary winding and said fedback fraction of the DC output voltage and as an input signal to the later stages such as an comparator for the latch current for comparing it with an overcurrent setting value, of a setting voltage generator for generating a set digital signal to set the DC output voltage, of a subtractor for subtracting said setting digital from said input signals signal to evaluate a driving signal for said switching element 49, of digital arithmetic operation circuits each for evaluating and outputting an on-period and on-time of said switching element from said input signals as a function of said driving signal to said switching element, and of said comparator for comparing said detected current signal flowing through said switching element 45 and through said primary and tertiary windings with said overcurrent setting value to provide said driving signal with an additional function of cutting off said switching element when an overcurrent flow therethrough.

The above and other objects, features and advantages of the present invention will become more apparent from the following description when taken in conjunction with the acompanying drawings in which a preferred embodiment of the present invention is shown by way of illustrative example.

DESCRIPTION OF THE PREFERRED EMBODIMENT

In what follows, an embodiment of a switching regulator according to the present invention will be described.

Figure 1:
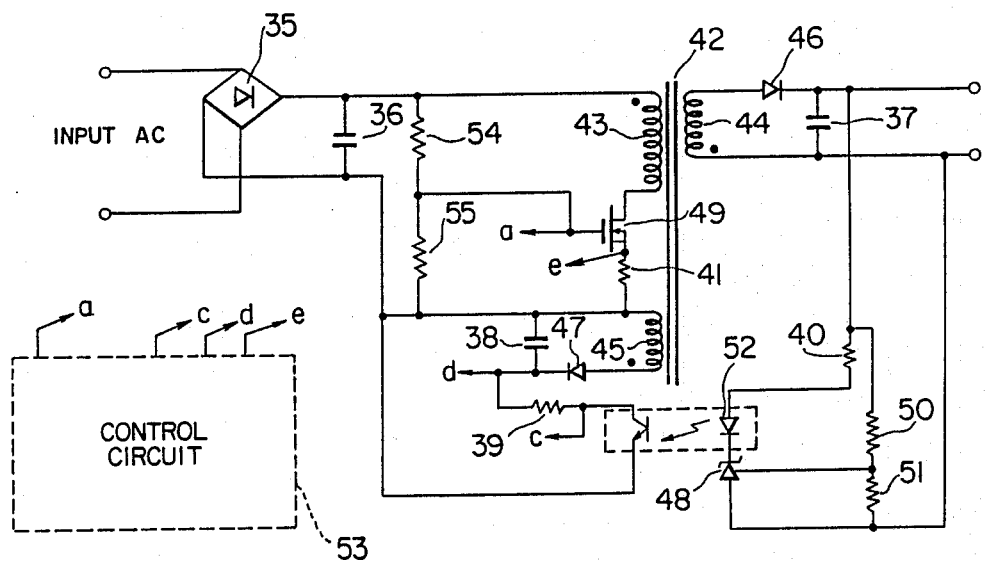
FIG. 1 is a circuit diagram illustrating an embodiment of a switching regulator according to the present invention.

FIG. 1 is a circuit block diagram illustrating the embodiment of a switching regulator of the present invention.

As shown in the same figure, an AC input voltage is rectified through a diode bridges 35 and fed to a primary winding 43 of a high frequency transformer 42 using a filter capacitor 36. The AC input voltage fed to the primary winding 43 of the high frequency transformer 42 is switched on and off by a switching element 49 connected to the primary winding 43 at its drain and to a tertiary winding 45 of the high frequency transformer 42 at its second gate and its source, both directly coupled, through a resistor 41. The AC input voltage thus switched on and off is taken out on the secondary winding 44 of the high frequency transformer 42, rectified through a rectifier diode 46 and a capacitor 37, and output at an output terminals to the outside. The switching element 49 is started in its switching operation by the application of the rectified AC input voltage divided by the resistors 54 and 55 to its gate electrode. The tertiary winding 45 produces an error voltage as a signal for controlling the DC output voltage, and supplies the error voltage to a control part described later. Likewise, a shunt regulator 48 partly detects the output voltage as another error voltage through resistors 50 and 51 connected across the output terminals. This fraction of the DC output voltage is fed to the cathode of a photocoupler 52 connected at its anode to one end of the secondary winding on the side of the diode 46 connected thereto through a resistor 40. The photocoupler 52 then feedbacks this fraction of the DC output voltage on the secondary side to the control circuit part 53 on the primary side as a signal (C). The foregoing (d) indicative of tertiary winding voltage is fed from one end of the tertiary winding 45 to the control circuit 53 through a rectifier circuit composed of a capacitor 38 and a diode 47. Likewise, a signal (e) detected as a voltage across a resistor 41 through which a switching current of the switching element 49 is conducted is also fed from the switching element 49 at the source thereof connected to the tertiary winding 45 through the resistor 41 to the control circuit 53.

Here, the control circuit part 53 thus receiving the foregoing signals (d), (c), and (e) issues on the basis thereof a driving signal (a) for driving the switching element 49 to control its switching period (hereinafter referred to as an on-period) and a conduction time interval (hereinafter referred to as an on-time) such that the DC output voltage is made constant with the aid of a digital arithmetic operation described later.

In the following, the control circuit part 53 will be described in further detail with reference to FIGS. 2 and 3.

Figure 2:
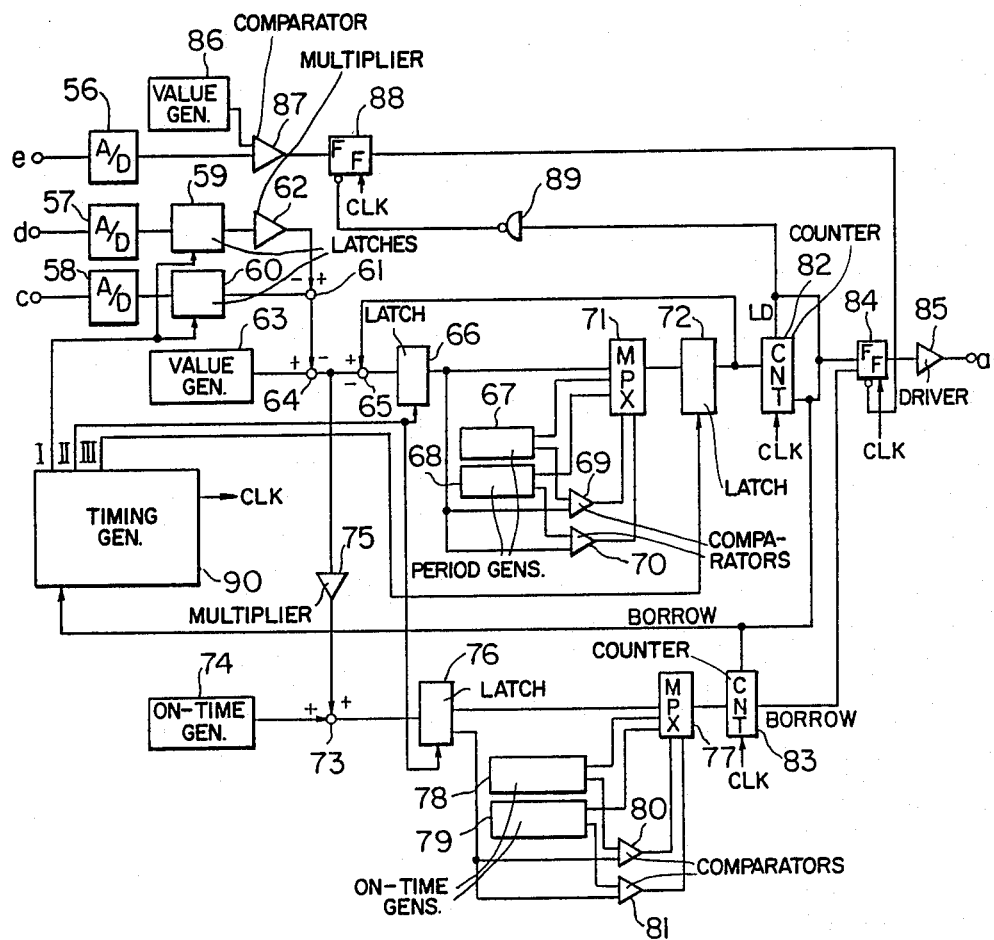
FIG. 2 is a circuit block diagram illustrating a control circuit part.
Figure 3:
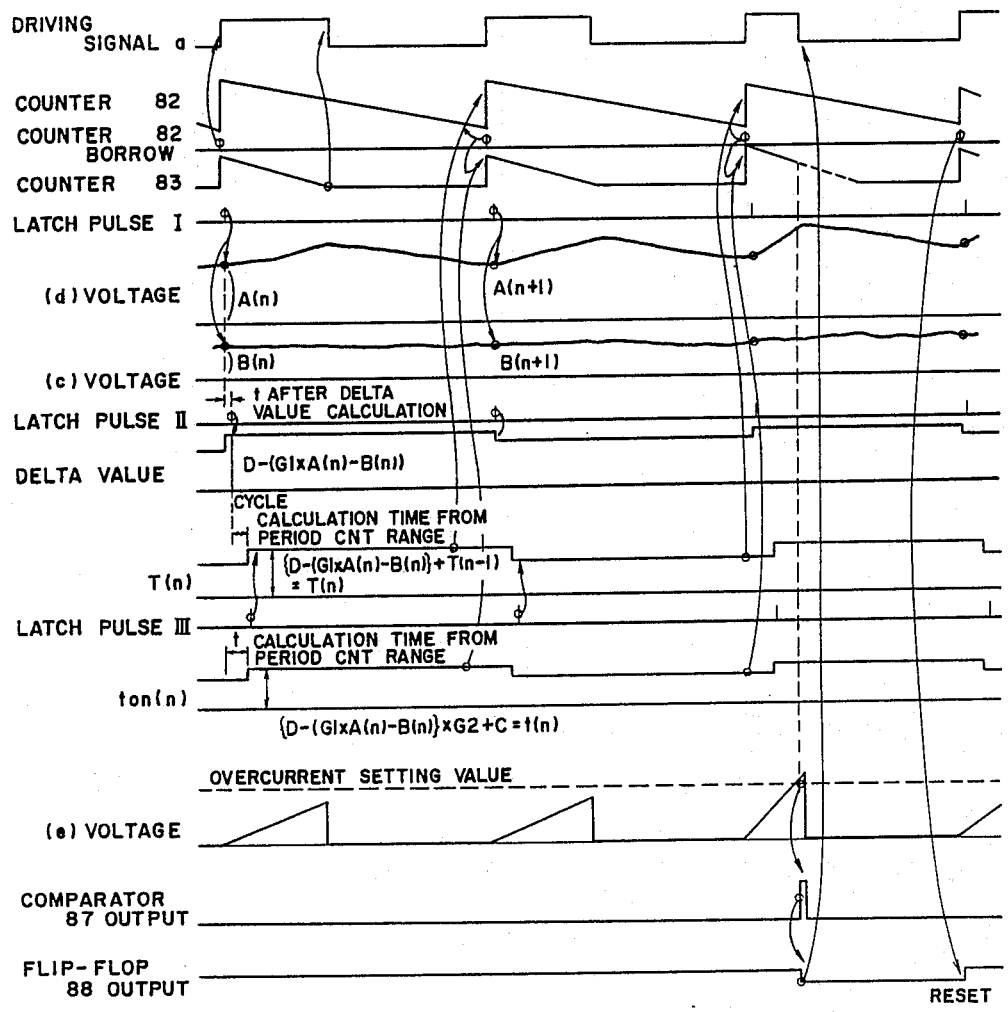
FIG. 3 is a timing chart illustrating the operation of the control circuit part.

FIG. 2 is a circuit block diagram illustrating the control circuit 53, and FIG. 3 is a timing chart illustrating the operation of FIG. 2.

For the error input to the control circuit part 53, although there were employed previously the signals (d) and (c) for the control; (d) the voltage produced on the tertiary winding 45, (c) the fraction of the voltage fedback from the DC output, either of those signals (d) and (c) will do.

The control circuit part 53 consists mainly of three flows of processing the control signals: flow I for evaluating the on-period T of the switching element 49 to derive a roll of the driving signal (a) using the signals (d) and (c), flow II for evaluating the on-time to N of the switching element 49 to derive another roll of the driving signal (a) using the same signals (d) and (c), flow III for providing further another roll of the driving signal (a) to cut off the switching element 49 when an overcurrent flows therethrough using the signal (e).

In the following, the description will be done along those flows I, II, and III of the signal processing.

In the flow I, the signals (d), (c), analog signals, are converted to digital signals (d), (c) through A/D converters 57 and 58. These digital signals (d) and (c) are respectively latched in latches 59 and 60 in the timing of a latch pulse to provide latched signals A(n) and B(n), as illustrated in FIG. 3. The latched signal A(n) is multiplied by a multiplication factor G1, a coefficient to match the latched signal A(n) with the latched signal B(n), in their magnitudes by a multiplier 62, from which the multiplied latched signal A(n) and the latched signal B(n) output from the latch 60 is subtracted by a subtractor 61. Thus, the 61 outputs a subtracted signal $G1 \times A(n) - B(n)$. The meaning of the multiplication factor G1 is as follows. First, it is assumed a fractional change of the voltage, the aforementioned voltage (d), produced across the tertiary winding 45 upon the DC output voltage being changed by Vo is $\Delta ed$, and a fractional change of the fedback voltage, the aforementioned voltage (c), from the DC output is $\Delta c$. Here, the DC output is fedback through the shunt regulator 48 and the photocoupler 52, and hence a differential coefficient $\Delta c / \Delta Vo$ becomes larger than a differential coefficient $\Delta ed / \Delta Vo$ near the target DC voltage to be controlled. As a result, the multiplier 62 adjusts both the latched signals A(n) and B(n) by the multiplication to match both the differential coefficients for providing a proper input voltage to the succeeding stage for digital computation thereafter.

Here, G1 is given as follows:

$$G1 = \frac{\Delta c / \Delta Vo}{\Delta d / \Delta Vo} = \frac{\Delta c}{\Delta d}$$

This input voltage $G1 \times A(n) - B(n)$ is proportional to the DC output voltage which a switching regulator has output at present. That is, it becomes larger with a higher DC output voltage, while becoming smaller with the lower DC output voltage. In other words, with the higher DC output voltage the signal (d) becomes larger but the signal (c) becoming smaller, while with the lower DC output voltage the signal (d) becomes smaller but the signal (c) becoming larger.

Then, the input voltage is fed to a subtractor 64 wherein it is subtracted from a digitized value (D) (hereinafter referred to as a set voltage is subtracted therefrom)) the digitized value (D) being supplied from a digitized value generator 63 for setting the DC output voltage uniquely. If a difference $\Delta = D - (G1 \times A(n) - B(n))$ (hereinafter referred to as a delta value) $> 0$, then it measn the DC output voltage is low, or the output load is heavy, while if $< 0$, then it means the DC output voltage is high, or the output load is light. Here, the timing of the delta value $\Delta$, is as illustrated in FIG. 3.

The driving signal (a) for driving the switching element 49 is calculated on the basis of the aforementioned delta value $\Delta$. The driving signal (a) is a function of the on-period T and on-time $t_{on}$ of the switching element. That is, the on-period T is shortened while the on-time $T_{on}$ is prolonged, as the load becomes heavier.

The following is the calculation for the on-period T.

A subtractor 65 subtracts the delta value from a latch output corresponding to an on-period $T(n-1)$ before one time evaluated by a latch 72 ad feedback therefrom, and outputs $X = T(n-1) - \Delta$. The result X is latched by a latch pulse (II) in a latch circuit 66 after finishing the subtraction as illustrated in FIG. 3, and output to a period limiter part.

Figure 4:
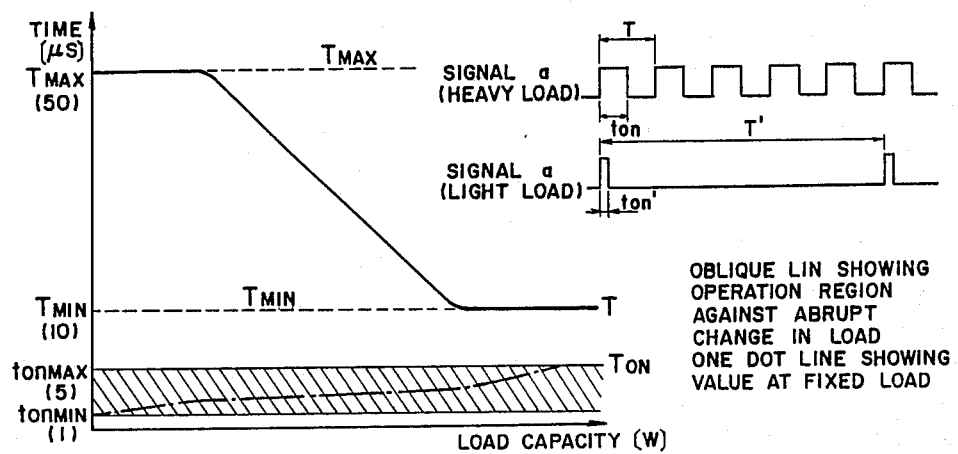
FIG. 4 is a graphical representation illustrating a result of calculation by a period limiter circuit part.

The period limiter part consists of maximum and minimum period generators 67, 68, each for generating maximum and minimum periods, comparators 69, 70 for comparing the output X from the latch 66 with the maximum and minimum periods from the maximum and minimum period generators 67, 68, a multiplexer 71, and the latch 72. The period limiter circuit part provides its output T(n) such that the on-period T, the result of its calculation, falls into a range between the maximum period $T_{MAX}$ and the minimum period $T_{MIN}$ as illustrated in FIG. 4. That is, the multiplexer 71 provides the output T(n) as follows.

$X > T_{MAX} \ldots T(n) = T_{MAX}$ $T_{MAX} \geq X \geq T_{MIN} \ldots T(n) = X$ $T_{MIN} > X \ldots T(n) = T_{MIN}$ This output T(n) is latched by a latch pulse (III) in a latch 72 upon the calculation being finished, as illustrated in FIG. 3. Hereby, the calculation of the on-period T is finished.

In the following, the flow II to evaluate the on-time $t_{on}$ will be described.

An adder 73 receives the delta value $\Delta$ multiplied by a parameter G2 from a multiplier 75 and an output (C) from a set minimum on-time generator 74, which has been previously set, and adds them. The parameter G2 is to determine a gain, a ratio of the output on-time $t_{ON}$ to the input error value to the present on-time $t_{ON}$ calculation circuit, an on-time limiter part described later.

A method to determine the parameter G2 is as follows.

First, the stability of the DC output voltage is assumed to fall into a range of $V_o - \Delta V$ to $V_o + \Delta V$. Then, the parameter G2 is determined such that the on-time upon the DC output voltage being $(V_o - V)$ gets the maximum on-time $t_{ONMAX}$ while the same upon the DC output voltage being $V_o + V$ gets the minimum on-time $t_{ONMIN}$.

Now, the result of the aforementioned addition is latched by a latch by a latch pulse (III) in a latch 76, as illustrated in FIG. 3. Thereupon, the following relation holds:

$$Y = G2 \times \Delta + C$$
$$= G2 \times [\{D - (G1 \times A(n) - B(n))\} + C]$$

The result is supplied to the on-time limiter part composed of maximum and minimum on-time generators 78, 79, comparators 80, 81, and a multiplexer 77. The multiplexer 77 transmits the following result to a counter 83. The on-time $t_{ON}$ calculation is thus finished.

$$Y > t_{ONMAX} \ldots t_{ON(n)} = t_{ONMAX}$$
$$t_{ONMAX} \geq Y \geq t_{ONMIN} \ldots t_{ON(n)} = Y$$
$$t_{ONMIN} > Y \ldots t_{ON(n)} = t_{ONMIN}$$

Decrement counters 82, 83 are respectively loaded with the result of the aforementioned calculation to start their countings, by a load pulse generated by a borrow generated by the counter 82 upon its counting being finished, the counter 82 executing its decrement counting on the basis of the result of the calculation before one time, i.e., a period $T(n-1)$. A flip-flop 84 is set upon the counters 82, 83 starting their countings, and operated by a reference clock CLK reset by a borrow signal from the counter 83 upon the counter 83 finishing its counting as illustrated in FIG. 3. An output from the flip-flop 84 is supplied to the switching element 49 through a driver 85 as the driving signal (a) for the switching element 49.

A period where the flip-flop 84 is set provides a conduction period of the switching element.

Thereafter, the same operation is repeated until the DC output voltage is made constant.

Here, in the processing flow III, a current detection signal (e) detected across the resistor 41 connected between the source of the switching element 49 and one end of the tertiary winding 45 is A/D converted by an A/D converter 56. The current detection signal (e) is to cut off the switching element 49 upon an overcurrent flows through the switching element 49. A digitized value E of the current detection signal 9e) is compared in a comparator 87 with an output F issued from an overcurrent set value generator 86. A flip-flop 88 is set by the reference clock when $E \geq F$. The flip-flop 84 is forcedly cleared by the output from the flip-flop 86 to cut off the switching element 49. The output from the flip-flop 88 is cleared by a signal yielded by permitting an inverter element 89 to invert a borrow signal from the counter 82. Accordingly, that output continues until the decrement counter 82 finishes its counting. This causes the switching element 49 to be cut off to ensure one cycle of the on-period even if the output from the comparator 87 is inverted.

Here, timing control for the control circuit part will be described with further reference to FIG. 3.

A timing generator 90 generates timing signals to operate respective latch counters in the control circuit. The timing generator 90 is composed of an oscillator and a counter, etc., and issues the reference clock CLK to the respective portions in the control circuit part from the oscillator therein, while it generates the latch pulses (I), (II), and (III) on the basis of the borrow signal from the decrement counter 82 as illustrated in the figure. The latch pulse (I) is generated with a delay of the switching time or more of the switching element 49 with respect to the borrow signal from the counter 82 in order to avoid noise produced from the switching element 49 upon the switching element 49 being switched. The latch pulse (II) is generated with a delay of the arithmetic operation times of the multipliers 62, 75, subtractors 61, 64, 65, and adder 73 with respect to the latch pulse (I). The latch pulse (III) is generated with a delay of the arithmetic operation time of the period limiter circuit part with respect to the latch pulse (II).

Figure 5:
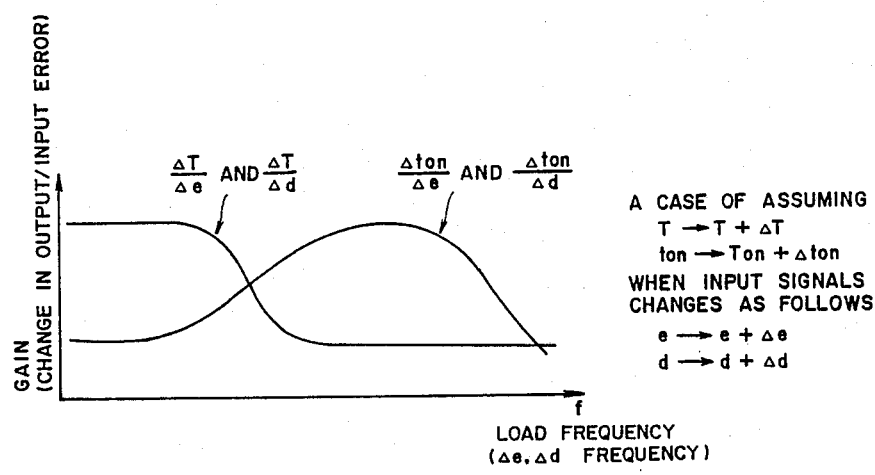
FIG. 5 is a graphical representation illustrating the frequency characteristics of an on-period arithmetic circuit and an on-time arithmetic circuit.
Figure 6:
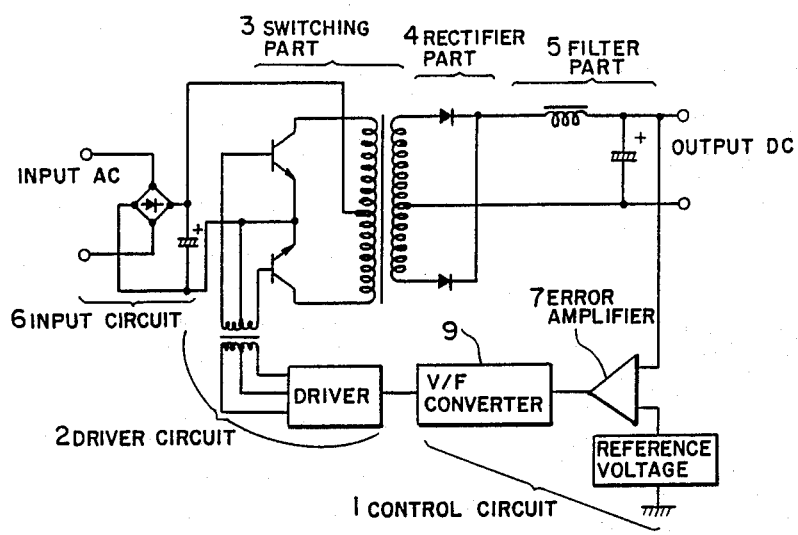
FIG. 6 is a circuit block diagram illustrating a prior art example.
Figure 7:
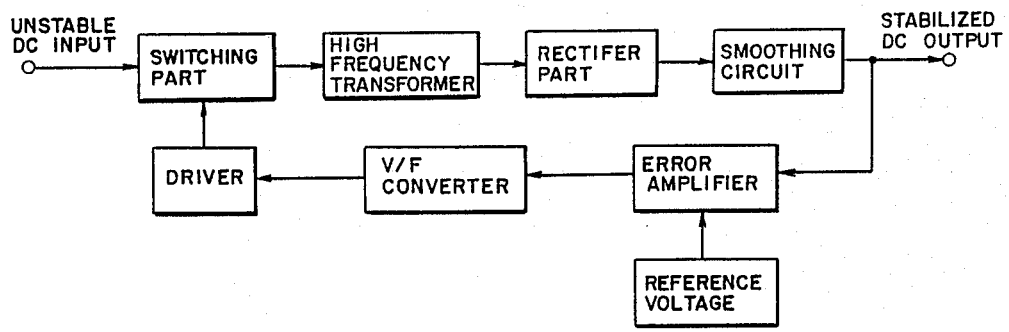
FIG. 7 is a circuit block diagram illustrating the operation of the prior art example.
Figure 8:
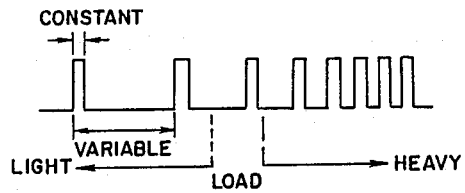
FIG. 8 is a graphical representation illustrating a relationship between a load and the number of pulses.
Figure 9:
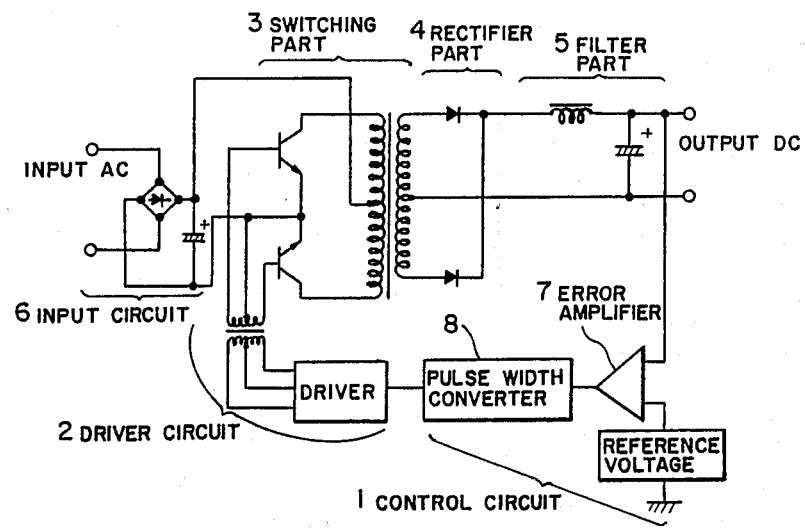
FIG. 9 is a block diagram illustrating another prior art example.
Figure 10:
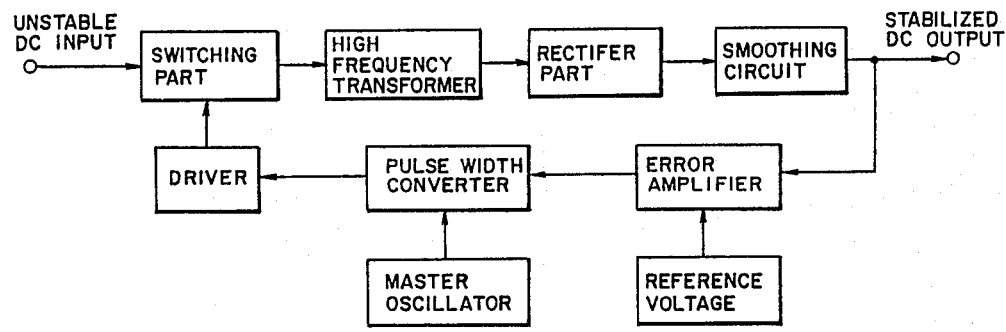
FIG. 10 is a circuit block diagram illustrating the operation of FIG. 9.
Figure 11:
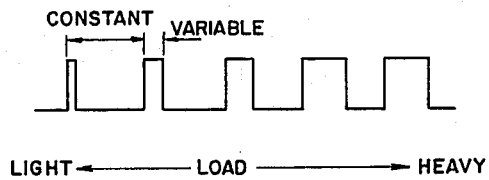
FIG. 11 is a graphical representation illustrating a relationship between a load and the number of pulses.
Figure 12:
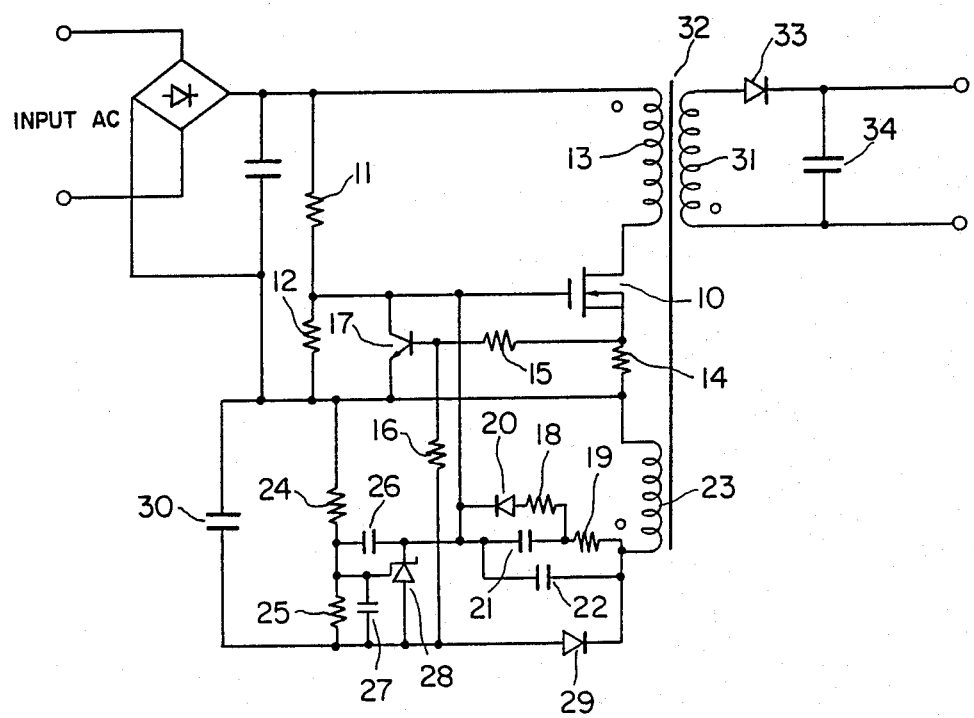
FIG. 12 is a circuit block diagram illustrating another prior art example.
Figure 13:
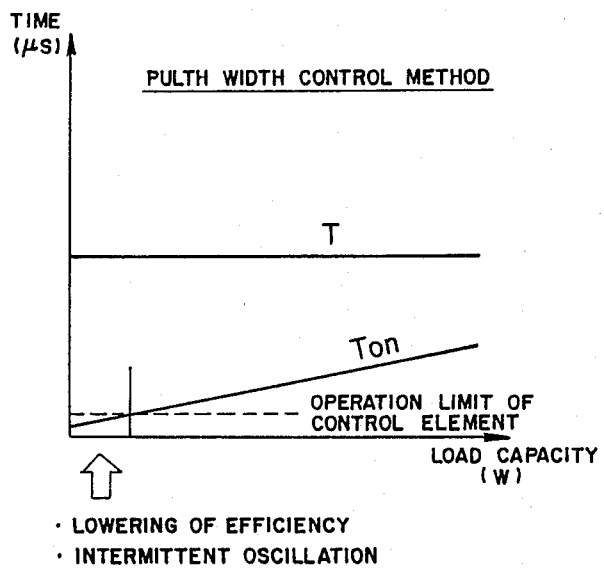
FIG. 13 is a graphical representation illustrating a relationship between the on-period and the on-time.
Figure 13:
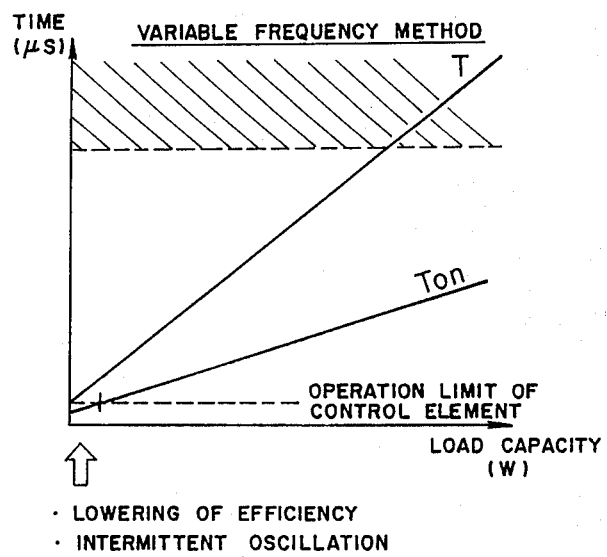
Figure 14:
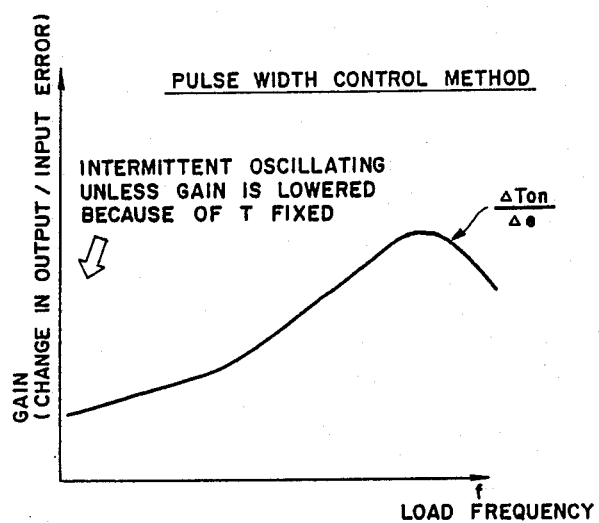
FIG. 14 is a graphical representation illustrating a relationship between load frequency and gain.
Figure 14:
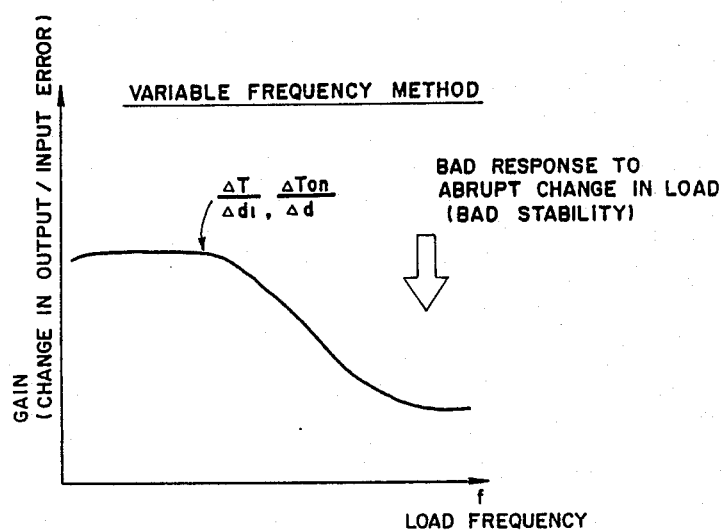

Here, referring to FIG. 5, frequency characteristics of the on-period T arithmetic operation circuit and the on-time $t_{ON}$ arithmetic operation circuit according to the present embodiment are demonstrated. As described above, the on-period T and the on-time $t_{ON}$ are calculated in conformity with the following equations.

$$T(n) = T(n-1) - \Delta$$

$$t_{ON}(n) = G_2 \cdot \Delta + t_{ONMIN}$$

That is, for the on-period T a difference equation using the error signal is employed, while for the on-time $t_{ON}$ the error signal multiplied by the parameter $G_2$ is employed. Accordingly, the gain of the whole control system is suppressed such that the on-time $T_{ON}$ can take the whole region of one time arithmetic operation period from $t_{ONMIN}$ to $t_{ONMAX}$, while the on-period T can take the region of from $T_{MIN}$ to $T_{MAX}$ after several cycles of the arithmetic operation periods.

As a result, for the frequency characteristics the on-time $t_{ON}$ control has its peak in the range of the high frequency, and hence the control rapidly follows up rapid variations in the load for the one on-time during one period to prevent the variations of the DC output voltage from being varied.

Moreover, the present embodiment adopts the respective limit values as follows.

$T_{MAX}$ ... 50 μs for making the switching period lower than audio-frequency $T_{MIN}$ ... 10 μs for preventing the loss of the switching element.

$t_{ONMAX}$ ... 5 μs for making the on-duty at the maximum load less than 50 %.

$t_{ONMIN}$ ... 1 μs from the capability of the switching element 49.

Thus, the dynamic range of the present switching regulator is made stably operatable up to 1/25 of the maximum load capacity.

According to the present invention, as described above, the tertiary winding voltage signal indicative of the voltage appearing across the tertiary winding and the fedback voltage from the DC output, both being error voltages, are converted through A/D converters, to digital signals. A detected current signal, a fraction of a current flowing through the switching element and through primary and tertiary windings of the high frequency transformer is likewise converted to a digital signal through and A/D converter. The digital signals are supplied to the subtractor wherein a setting digital signal for setting the DC output voltage is subtracted from the foregoing digital signals for providing input voltages to the next digital arithmetic operation circuits to evaluate a driving signal for the switching element. Those input voltages input into the digital arithmetic operation circuits are employed for evaluation of the on-period and on-time of the switching element to provide the driving signal. The driving signal for the on-period and on-time of the switching element is thus adapted to increase the on-period as well as the on-time when the load is heavy. Hereby, switching losses, which are caused by the limit of capability of the switching element as a result of an increase of the on-period upon the load being light, are prevented from being increased, while the switching frequency is prevented from becoming an audio-frequency upon the load being heavy. Thus, a high efficiency switching regulator with a wide range of equal load capacity is constructed. Additionally, the current signal converted to the digital signal is compared in the comparator with an overcurrent setting value to provide the driving signal for additionally providing thereto a function of cutting off the switching element when an overcurrent flows therethrough. Moreover, the control circuit part has a digital construction to thereby prevent the DC output voltage from being varied owing to the variations of the constituent elements and to thereby make use of LSI technology:

Furthermore, although the aforementioned embodiment adopted the on-off type converter for the digital arithmetic operation part in the control circuit part, the present invention is applicable to switching regulators of other types having, for example, an on-on type converter or a chopper type converter, etc.

Although the invention has been described in its preferred form with a certain degree of particularity, it is to be understood that many variations and changes are possible in the invention without departing from the scope thereof.

What is claimed is:

1. A switching regulator comprising:
   (a) a high frequency transformer composed of a primary winding wound around a core on the primary side across which primary winding an AC input fed through a diode bridge and a low pass filter is applied, a secondary winding wound around the same on the secondary side for boosting the rectified AC input and transmitting the same to an output terminal through a rectifier circuit and a tertiary winding wound around the same on the primary side providing a voltage signal thereacross as an error signal;
   (b) a switching element connected to one ends of said primary and tertiary windings for switching said rectified AC input to permit the switched AC input to be boosted and transmitted to the secondary side through said secondary winding for providing the DC output voltage;
   (c) a shunt regulator provided on the secondary side of said high frequency transformer for detecting a fedback fraction of the DC output voltage as another error signal;
   (d) a photocoupler connected to said shunt regulator for feedbacking said fedback fraction of the DC output voltage detected by said shunt regulator to the primary side;
   (e) a control circuit part provided on the primary side of said high frequency transformer and composed of analog to digital converters for converting to digital signals said voltage signal appearing across the tertiary winding, said fedback fraction of the DC output voltage, and a current signal flowing through said switching element and through said primary and tertiary windings as input signals to the later stages such as latches for the former two voltages for latching said A/D converted digital signals of said voltage signal across the tertiary winding and said fedback fraction of the DC output voltage and as an input signal to the later stages such as a comparator for the latter current for comparing it with an overcurrent setting value, of a setting voltage generator for generating a set digital signal to set the DC output voltage, of a subtractor for subtracting said digital signal from said input signals to evaluate a driving signal for said switching element, of digital arithmetic operation circuits each for evaluating and outputting an on-period and on-time of said switching element from said input signals as a function of said driving signal to said switching element, and of a comparator for comparing said current signal flowing through said switching element and through said primary and tertiary windings with said overcurrent setting value to provide said driving signal with an additional function of cutting off said switching element when an overcurrent flows therethrough.

2. A switching regulator according to claim 1, wherein for variations in output load capacity, the on-period of the switching element is reduced and the on-time is increased when the output load capacity is large, while the on-period is increased and the on-time is reduced when the output load capacity is small.

* * * * *